J. A. Bazin,
Cog Gearing.
Nº 11,585.            Patented Aug. 22, 1854.
Fig. 1.
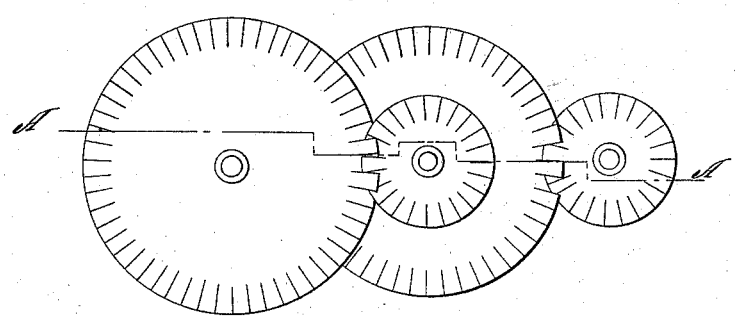
Fig. 2.
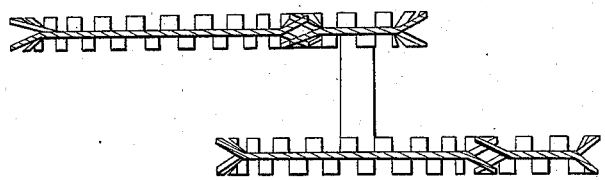
Fig. 3.     Fig. 4.     Fig. 5.
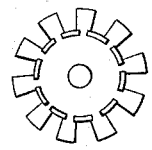  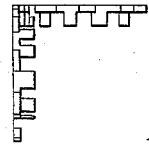
Witnesses:
Sam. Cooper
John S. Low
Inventor:
James A. Bazin.
AM. PHOTO-LITHO. CO. N.Y. (OSBORNE'S PROCESS)

UNITED STATES PATENT OFFICE.

JAMES A. BAZIN, OF CANTON, MASSACHUSETTS, ASSIGNOR TO ALFRED B. ELY, OF BOSTON.

COG-GEARING.

Specification of Letters Patent No. 11,585, dated August 22, 1854.

*To all whom it may concern:*

Be it known that I, JAMES A. BAZIN, of Canton, county of Norfolk, State of Massachusetts, have invented a new and Improved Method of Making Cog-Gearing, of which the following is a full, clear, and accurate description, reference being had to the annexed drawing, making part of this specification, in which—

Figure 1 is a plan of several gear made upon my improved plan. Fig. 2 is a section through the same upon the line A A of Fig. 1. Figs. 3, 4, and 5 will be referred to hereafter.

To enable others skilled in the art to make and use my invention I will proceed to describe the manner in which I have carried it out.

The gearing is stamped out from plate or malleable metal the periphery of the wheels being cut in a radial direction as seen in Fig. 1 into portions of a width and length corresponding to the width and length of the teeth every alternate portion being bent slightly in the opposite direction as seen in Fig. 2. When the wheels are geared together the tooth of the one that is raised enters into the space left in the other by the tooth that is depressed. An economical and durable cog gear is thus produced the whole being stamped out at a single operation, while the number of the bearing surfaces of the teeth is double what they are in ordinary cog gear, the space between the teeth of the ordinary cog wheel being replaced in my wheel by a tooth which takes its own portion of the wear. Miter wheels may be constructed upon this plan by bending every alternate tooth at right angles with the plate as seen in Figs. 3, 4 and 5.

What I claim as my invention and desire to secure by Letters Patent is—

The within described manner of manufacturing cog wheels every alternate tooth being bent in opposite directions from the plane of the plate in the manner described and for the purpose set forth.

JAMES A. BAZIN.

Witnesses:
SAM. COOPER,
J. S. CLOW.